United States Patent [19]

Heller et al.

[11] 4,343,870
[45] Aug. 10, 1982

[54] SEMICONDUCTOR LIQUID JUNCTION PHOTOCELL HAVING A P-TYPE PHOTOACTIVE ELECTRODE

[75] Inventors: Adam Heller, Bridgewater; Hans J. Lewerenz, Maplewood; Barry Miller, New Providence, all of N.J.

[73] Assignee: Bell Telephone Laboratories, Incorporated, Murray Hill, N.J.

[21] Appl. No.: 184,925

[22] Filed: Sep. 8, 1980

[51] Int. Cl.³ .............................................. H01M 6/36
[52] U.S. Cl. .................................................. 429/111
[58] Field of Search .......................................... 429/111

[56] References Cited

U.S. PATENT DOCUMENTS 4,182,796  1/1980  Heller et al. ..................... 429/111

OTHER PUBLICATIONS

A. A. K. Vervaet et al., "Some Electrochemical Processes at the n–and P-InP Electrodes", *J. Electroanal. Chem.*, vol. 91, pp, 133-136 (1978).
P. A. Kohl et al., "Semiconductor Electrodes XVII, Electrochemical Behavior of n–and p-Type InP Electrodes in Acetonitrile Solutions", *J. Electrochem. Soc.*, vol. 126, pp. 598-603 (1979).
D. C. Bookbinder et al., "Photoelectrochemical Reduction of N,N'-Dimethyl-4,4'Dipyridinium in Aqueous Media at P-Type Silicon", *J.A.C.S.*, vol. 101, pp. 7721-7723 (1979).
H. Gerischer, "Electrochemical Photo and Solar Cells-Principles and Some Experiments", *J. Electroanal. Chem.*, vol. 58, pp. 263-274 (1975).

*Primary Examiner*—Aaron Weisstuch
*Attorney, Agent, or Firm*—Richard D. Laumann

[57] ABSTRACT

A semiconductor liquid junction photocell having a photovoltaic junction between a p-type photoactive electrode comprising InP or Si and an electrolyte comprising a redox couple selected from the group consisting of $V^{2+}/V^{3+}$, $Nb^{4+}/Nb^{5+}$, and $Ti^{3+}/Ti^{4+}$ produces a stable photocurrent output.

11 Claims, 2 Drawing Figures

SEMICONDUCTOR LIQUID JUNCTION PHOTOCELL HAVING A P-TYPE PHOTOACTIVE ELECTRODE

TECHNICAL FIELD

This invention relates generally to semiconductor liquid junction photocells and particularly to such photocells having p-type photoactive electrodes.

BACKGROUND OF THE INVENTION

Concern over the possible depletion of fossil fuel energy sources has generated interest in recent years in the search for and development of alternative energy sources. Numerous alternative energy sources have been contemplated including solar energy utilized as electricity either directly through photovoltaic devices or indirectly through thermal devices. The former has not received as much attention as the latter which will, as presently contemplated, use semiconductor devices. Such devices are presently too expensive, compared to other sources of electricity, for commercially successful widespread utilization.

Considerable effort has, therefore, been expended in attempts to reduce the cost of photovoltaic devices. For example, much effort has been directed toward reducing the cost of silicon solar cells having p-n junctions. This effort is attractive because silicon is both abundant and cheap. Other efforts have been directed at other materials and other types of cells. For example, solar cells in which the active part of the cell is a junction formed at a liquid-solid interface have been examined. These cells are commonly referred to as semiconductor liquid junction cells. The characteristics of this type of cell are discussed by Gerischer in *The Journal of Electroanalytical Chemistry and Interfacial Electrochemistry*, Vol. 58, pp. 263–274 (1975).

Although many materials have been investigated for use in such cells, the highest efficiency, approximately 12 percent, has been obtained in cells using a ruthenium treated n-type GaAs photoactive electrode and a selenide-polyselenide redox couple. These cells are described in U.S. Pat. No. 4,182,796 issued to Adam Heller, Barry Miller and Bruce A. Parkinson on Jan. 8, 1980.

The use of p-type electrodes in such cells is interesting because illumination tends to protect the semiconductor from surface oxidation which is an obstacle to stability in n-type cells. In cells using p-type electrodes, electrons drift to the electrode-electrolyte interface and reduce an oxidized species in the electrolyte. Many p-type semiconductors, including GaP, GaAs, Si, Ge, CdTe, and InP, have been investigated in both aqueous and nonaqueous electrolytes. None of these cells has approached the efficiency achieved with the above described n-type GaAs system although substantial photovoltages have been noted for strongly reducing solutions such as Eu(III)/EU(II) in acid. In some cases, the cell voltages have been observed to be insensitive to the redox potentials and it was thus concluded that the cells would be of limited value.

SUMMARY OF THE INVENTION

We have found that a semiconductor liquid junction photocell comprising a counterelectrode, a photovoltaic junction between a p-type semiconductor electrode and a liquid electrolyte comprising a redox couple produces a stable photocurrent output upon extended illumination with a redox couple selected from the group consisting of $V^{2+}/V^{3+}$, $Nb^{4+}/Nb^{5+}$, and $Ti^{3+}/Ti^{4+}$ cations. The p-type semiconductor electrode is selected from the group consisting of InP and Si. In an especially preferred embodiment, the electrode is InP and the redox couple is $V^{2+}/V^{3+}$. With a redox couple concentration of approximately 0.35 molar, a solar cell with a p-InP photoactive electrode had a solar electrical power efficiency of approximately 9.4 percent. It is believed that the stability and performance of these cells may be attributed at least partially to the fast kinetics of the redox couple.

DETAILED DESCRIPTION

Figure 1:
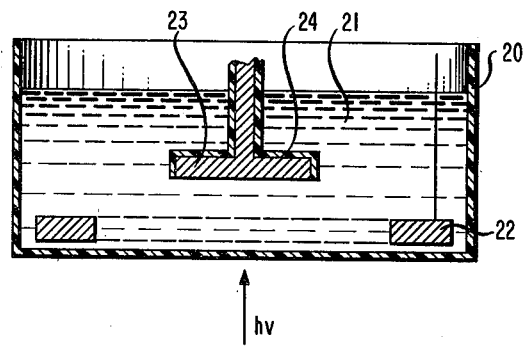
FIG. 1 is a schematic representation of a semiconductor liquid junction photocell.

The cell structure depicted in FIG. 1 comprises a container 20, liquid electrolyte 21, counterelectrode 22, and the photoactive electrode 23. The counterelectrode may be any inert material such as carbon. Electrode 23 comprises a p-type semiconductor material. A photovoltaic junction is formed at the electrode 23 electrolyte interface. The electrolyte is an aqueous solution comprising the redox couple. Electrode 23 is covered with epoxy 24, except where illuminated, to insulate it from the electrolyte. The container may be made of any conveniently available glass or plastic material that is inert with respect to the electrolyte. One surface of the cell, enclosing electrode 23, is transparent so that incident light, indicated as hv, may pass through to electrode 23.

The electrolyte comprises a redox couple selected from the group consisting of $V^{2+}/V^{3+}$, $Nb^{4+}/Nb^{5+}$, and $Ti^{3+}/Ti^{4+}$ cations. The redox couple concentration must be sufficient so that the cations are transported to the photoactive electrode in an amount sufficient to react with the flux of photogenerated electrons. The electrode comprises a semiconductor selected from the group consisting of InP and Si.

In one preferred embodiment, electrode 23 comprises p-type InP and the redox couple consists of $V^{2+}/V^{3+}$ cations. The invention will be described with respect to this cell and understanding of this cell will enable those skilled in the art to construct other cells in accordance with this invention.

The electrolyte containing the $V^{2+}/V^{3+}$ couple is conveniently prepared by dissolving the requisite amount of $V_2O_5$ in sufficient HCl to provide a solution which, after reduction with a sufficient amount of a material, such as Zn, added in small excess over $V^{5+} \rightarrow V^{2+}$ stoichiometry, yields a 4 M solution of HCl after the reduction. Other vanadium oxides or chlorides might be used as well as reducing agents other than Zn. The redox couple concentration must be sufficient to react with the current generated in the cell upon illumination. A concentration of approximately 0.35 molar has been found sufficient for solar illumination at Murray Hill, New Jersey. The $Ti^{3+}/Ti^{4+}$ couple is conveniently prepared by reducing $TiCl_4$ in HCl with Zn.

Surface preparation yielding a nonreflective surface has been found to be important in increasing efficiency. A matte black surface on the A face of InP is obtained by etching the crystal for approximately 30 to 60 seconds in a 2:2:1 solution of $HNO_3$, $H_2O$ and $HCl$. A 6:6:1 solution of the same compound yields an almost shiny A face of InP and photocells of efficiency smaller than obtained with the 2:2:1 solution. Si may be etched with a 5:5:3 solution of $HNO_3$:$CH_3COOH$:$HF$ plus 1 percent bromine.

Example 1: A p-type InP single crystal was grown by the gradient freeze technique with zinc doping at a concentration of $2.4 \times 10^{17}$ cm$^{-3}$ and a bulk resistivity of 0.28 ohm-cm. The crystal was sliced to yield (111) faces and polished with an alumina slurry, then by lens paper impregnated with a methanol-2 percent bromine solution. The A-face (111) InP, consisting entirely of In atoms, was exposed to the solution. A low reflectance black surface finish was obtained by a 2:2:1 etch of $HNO_3$-$H_2O$-$HCl$ for 30 seconds. An ohmic back contact was made by successively evaporating 300 Å of Zn and 1000 Å of Au and annealingg at 450 degrees C. for 15 seconds. The counterelectrode was carbon.

Figure 2:
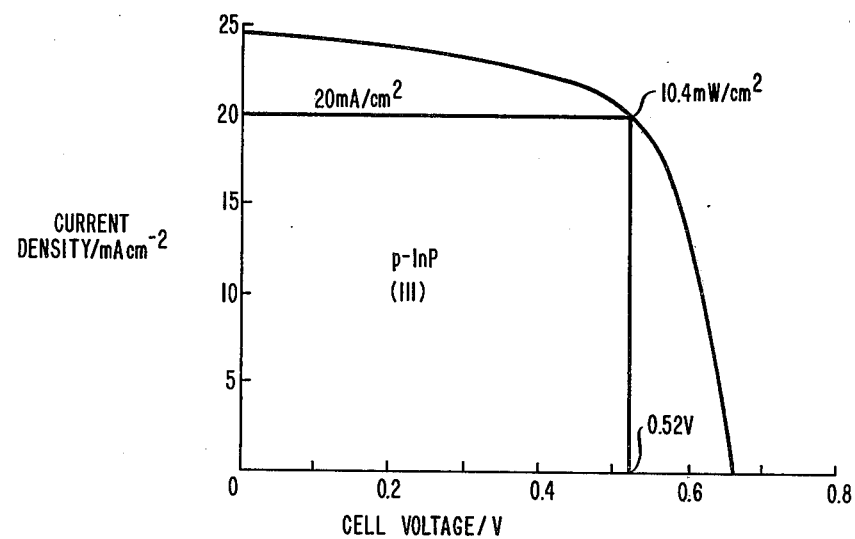
FIG. 2 is a plot of photocurrent density, in ma/cm$^2$, versus cell voltage, in tenths of a volt, for a photocell of this invention having a p-InP photoactive electrode.

FIG. 2 shows the current-voltage curve for this cell when illuminated by sunlight in Murray Hill, New Jersey, with an incident irradiance, i.e., insolation, of 110 mw/cm$^2$. The redox couple contained 0.35 M total vanadium (determinatively) and approximately 0.53 M total zinc ions (from stoichiometry). The pH was approximately 0.0. The short circuit current density is approximately 25 ma/cm$^2$, the open circuit voltage is 0.66 volts and the fill factor is 0.63. The solar to electrical power conversion efficiency is approximately 9.4 percent. The difference between the experimentally observed short circuit current density and the theoretically predicted current of 39 ma/cm$^2$ for a semiconductor having this bandgap energy is hypothesized as being caused by solution absorbance and reflection losses.

The same cell was illuminated by a tungsten-halogen lamp providing the equivalent of between 2 and 3 times AM1 (air mass 1) solar irradiance. The cell showed stable maximum power point characteristics at 80 ma/cm$^2$ and 0.5 volts under extended operation for a period of three days. Measured weight loss was less than the measurable limit of 1 mg upon passage of 13,000 C/cm$^2$. Additionally, no deterioration in current, voltage, fill factor, or electrode weight was found when the cell was cycled between short circuit and open circuit conditions while accumulating 3,000 C/cm$^2$. It is to be understood that other dopants and other concentrations may be used.

Example 2: Single crystal Si with B doping at a concentration of $7 \times 15$ cm$^{-3}$ and a bulk resistivity of 3 ohm-cm was used for the electrode after conventional slicing and polishing with 30 percent HF. A $V^{2+}/V^{3+}$ redox couple was used with a concentration of 0.35 M. The electrolyte had a pH of approximately 0.0 and a zinc ion concentration of approximately 0.53 M. At 101 mw/cm$^2$ irradiance of natural sunlight, the short circuit current was 20.4 ma/cm$^3$ and the open circuit voltage was 0.4 V. The solar to electrical power conversion efficiency was 2.8 percent. The same cell was illuminated by a tungsten-halogen lamp providing the equivalent of between 2 and 3 times AM1 solar irradiance. With a redox potential of $-0.47$ vs. SCE and a 0.35 M total vanadium electrolyte, no weight loss, within experimental limits of 1 mg/cm$^2$, was detected after passage of 20,000 C/cm$^2$ after illumination for 120 hours. The initial current of 66.7 ma/cm$^2$ declined to 37.5 ma/cm$^2$ after 120 hours.

The precise factors contributing to the exceptional stability and performance of the new InP cell are not known with certainty, but it is hypothesized that the fast kinetics of the $V^{2+}/V^{3+}$ couple, the suitable placement of the band edges, the nonreflective surface finish, and the surface chemistry of InP may all contribute. The latter may be the most important factor. Cations, e.g., $V^{3+}$ or $V^{2+}$ may be chemisorbed on the surface and may decrease the surface recombination velocity. Also, it is known that the surface recombination velocity of vacuum cleaved n-InP decreases upon oxidation by exposure to air from $10^6$ cm/sec to $10^3$ cm/sec. Furthermore, the high solar power conversion efficiency of indium oxide and junctions of other III-V compounds is related to the interfacial chemistry. The formation of a thin oxide layer on the p-InP electrode surface is likely upon either exposure to air or reaction with water. Observations on the oxidation of InP and the resultant reduction in the surface recombination velocity have been interpreted as being due to the saturation of reactive surface bonds by oxygen. Such saturation reduces the density of interfering interface states in those semiconductors that are oxidized exclusively to stable oxides with large energy gaps. In view of the large free energy of formation of both indium and phosphorus oxides and of their large bandgaps, it is expected that the states characteristic of oxidized InP interfaces will be both above and below the band edges and thus will not limit the performance of solar cells. For this reason, one would predict well-behaved liquid junctions independent of whether a bulk oxide film seals the InP surface or whether chemisorbed oxygen accounts for the removal of interface states.

It has been found desirable to operate the cells with as high a hydrogen ion concentration as practical. Such a condition displaces the band edges of the p-type semiconductors in the direction that achieves the highest cell voltages and provides high conductivity for the solution. In the cells discussed, the free HCl concentration was 1 M or higher. The minimum free acid concentration is the point of vanadium species precipitation. It is also possible that a low pH keeps the oxide layer on InP ad Si very thin, for example 3 to 4 Å, and improves cell performance.

A different situation arises with GaAs. The thermodynamic instability of the aresenic oxide/GaAs system may lead to the formation of free arsenic and gallium oxide at the interface. Arsenic then introduces states between the edges of the valence and conduction bands which may be responsible for both the high recombination velocity and, in some cases, the pinning of the Fermi level at the surface of GaAs. As a consequence of this difference in the surface chemistry of GaAs and InP, no noticeable reduction is observed in the $10^6$ cm/sec free surface recombination rate after exposure of GaAs to air.

We claim:

1. A photocell comprising a counterelectrode, a photovoltaic junction between a p-type semiconductor electrode, said p-type semiconductor being selected from the group consisting of InP and Si, and a liquid electrolyte, said electrolyte comprising a redox couple characterized in that
said redox couple is selected from the group consisting of $V^{2+}/V^{3+}$ and $Nb^{4+}/Nb^{5+}$ cations.

2. A photocell as recited in claim 1 in which said p-type semiconductor is InP.

3. A photocell as recited in claim 1 in which said p-type semiconductor has a nonreflective surface.

4. A photocell as recited in claim 2 in which said redox couple is $V^{2+}/V^{3+}$.

5. A photocell as recited in claim 4 in which redox couple has a concentration greater than approximately 0.35 molar.

6. A photocell as recited in claim 5 in which said electrolyte has a pH less than 1.

7. A photocell as recited in claim 6 in which said pH is approximately 0.0.

8. A photocell as recited in claim 6 in which said electrolyte further comprises approximately 0.5 M zinc ions.

9. A photocell comprising a counterelectrode, a photovoltaic junction between a p-type semiconductor electrode, said p-type semiconductor being selected from the group consisting of InP and Si, and a liquid electrolyte, said electrolyte comprising redox couple characterized in that said redox couple comprises $Ti^{3+}/Ti^{4+}$ cations and said electrolyte has a pH less than 1.

10. A photocell as recited in claim 9 in which said p-type semiconductor is InP.

11. A photocell as recited in claim 9 in which said p-type semiconductor has a nonreflective surface.

* * * * *